United States Patent [19]
Kimura

[11] Patent Number: 5,926,344
[45] Date of Patent: Jul. 20, 1999

[54] FLOATING HEAD SLIDER WITH CONCAVE SIDES, MAGNETIC DISK DEVICE WITH SUCH A SLIDER, AND METHOD FOR CONTROLLING AIR FLOW IN A SLIDER WITH DUST-TRAPPING CONCAVE SIDES

[75] Inventor: Kazunori Kimura, Tokyo, Japan

[73] Assignee: NEC Corporation, Tokyo, Japan

[21] Appl. No.: 08/903,432

[22] Filed: Jul. 30, 1997

[30] Foreign Application Priority Data

Jul. 30, 1996 [JP] Japan ................................. 8-200330

[51] Int. Cl.⁶ ........................................................ G11B 5/60
[52] U.S. Cl. ................................................................ 360/103
[58] Field of Search ................................. 360/103, 104, 360/125, 126

[56] References Cited

U.S. PATENT DOCUMENTS 5,479,306  12/1995  Ananth et al. ........................ 360/103
5,777,825   7/1998  Dorius ................................... 360/103

FOREIGN PATENT DOCUMENTS

| 61-170922 | 8/1986 | Japan . |
| 4-137286 | 5/1992 | Japan . |
| 5-20723 | 1/1993 | Japan . |
| 5-81810 | 4/1993 | Japan . |
| 6-44719 | 2/1994 | Japan . |
| 6-333354 | 12/1994 | Japan . |

*Primary Examiner*—Jefferson Evans
*Attorney, Agent, or Firm*—Young & Thompson

[57] ABSTRACT

In a floating head slider, a slider rail has a floating pressure generation surface of a prescribed width and which opposes a magnetic disk, a slider element, and a side wall extending from this floating pressure generation surface to the slider element. A prescribed depression is formed in the side wall of the slider rail so that the width of the center part of the slider rail in the height direction thereof is narrower than the width of the floating pressure generation surface.

21 Claims, 8 Drawing Sheets

FLOATING HEAD SLIDER WITH CONCAVE SIDES, MAGNETIC DISK DEVICE WITH SUCH A SLIDER, AND METHOD FOR CONTROLLING AIR FLOW IN A SLIDER WITH DUST-TRAPPING CONCAVE SIDES

BACKGROUND OF THE INVENTION

1. Field of the Invention

The present invention relates to a floating head slider, and more specifically to a floating he ad slider which is used in a magnetic disk apparatus.

2. Description of Related Art

Figure 8A:
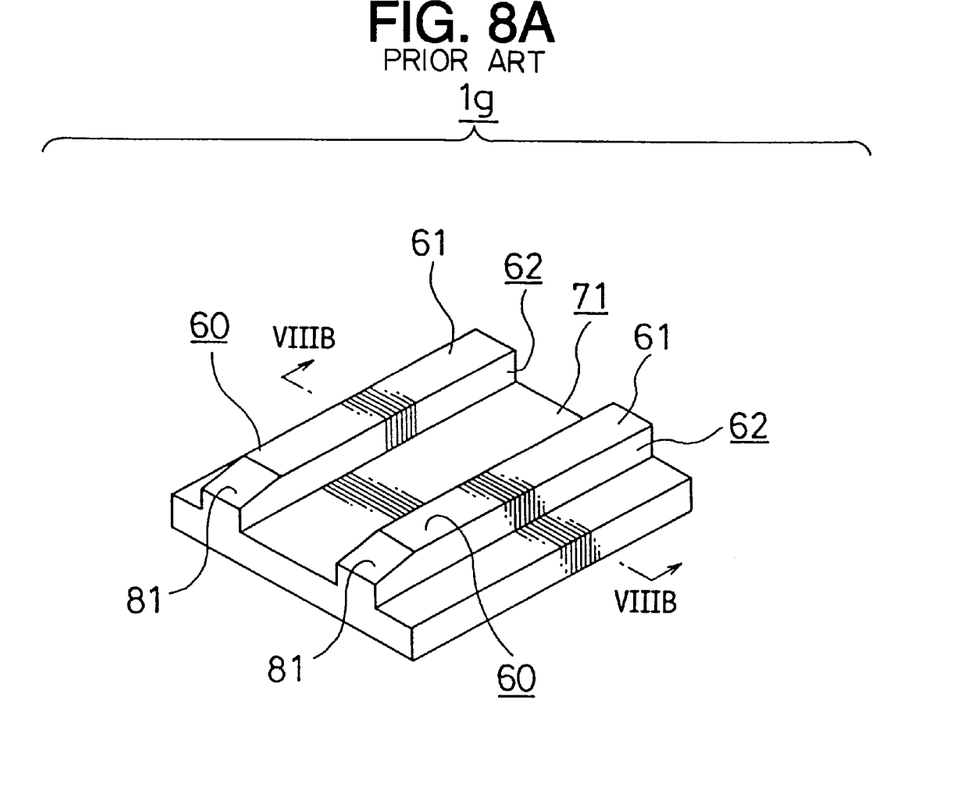
Figure 8B:
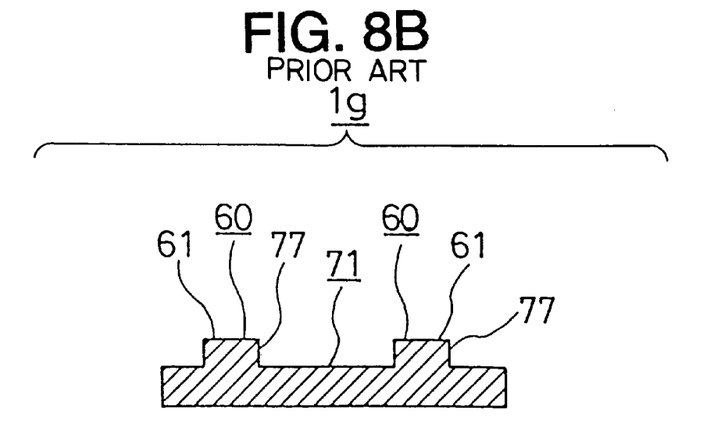

In the past, a floating head slider such as shown in FIGS. 8(A) and 8(B) has been used in a magnetic disk apparatus. The floating head slider 1g in generally used is formed by a rectangularly shaped slider element 71 and slider rails 60 which protrude from the surface of the slider element 71. The slider rails 60 extend along a flow of air, these slider rails 60 making physical contact with a magnetic disk.

In recent years, because of the appearance of high-density magnetic disks, there has been a trend towards the narrowing of the spacing between the floating head slider and the magnetic disk. In particular with regard to what is known as the contact start/stop (hereinafter referred to as CSS) system, the slider can wear down the roughness or protrusions in the surface of the disk, this being the case of the generation of dust.

As the spacing between the floating head slider and the magnetic disk during writing and reading of information becomes narrow, this occurs even when the floating head slider is in the floating condition.

Accompanying this phenomenon, floating dust intrudes in between the floating pressure generating surface of the slider rails and the magnetic disk provided in a disk driving device, this causing a temporary condition in which it is not possible to read and write information.

Additionally, dust becoming attached to the surface of the slider rails causes instability in the floating of the head slider, this resulting in a risk of damage being done to the magnetic disk and floating head slider, caused by the high-speed sliding between it and the magnetic disk.

The dust is generally generated from a surface of the slider or magnetic disk and sometimes generated from a surface of a protection layer of the slider or lubricating layer formed on a surface of the magnetic disk.

To solve the above-described problem, the Japanese Unexamined Patent Publication (KOKAI) No. 61-170922 discloses the provision of a prescribed step level change at the flow edge of air at the slider rail, this step level change causing a complex flow of air, thereby reducing amount of dust that accumulates at the outflow edge of the slider rail.

In the Japanese Unexamined Patent Publication (KOKAI) No. 5-81810, there is disclosed the formation of a V-shaped groove upstream from the air outflow edge on the floating pressure generation surface of the slider rail, this groove capturing the dust in the air flow and preventing it from coming into contact with the surface of the magnetic disk.

In the Japanese Unexamined Patent Publication (KOKAI) No. 4-137286, there is proposed the formation of an acute angle at a taper part of the end of a floating head slider, and the forming of a tapered surface with an acute angle between the outside surface of in the longitudinal direction of the slider rail and the floating pressure generation surface.

In the Japanese Unexamined Patent Publication (KOKAI) No. 6-44719, to provide a floating head slider that solves the problem of accumulated dust in a negative pressure slider, there is a disclosure of the separation of a cross rail formed at the air inflow edge by an open groove, this forming an escape path for the air flow, thereby suppressing the accumulation of dust.

In the Japanese Unexamined Patent Publication (KOKAI) No. 6-333354, there is the disclosure of the use of a cross rail that reaches the air inflow edge, and the elimination of the tapered part. This is a method of eliminating the dust that accumulates in the space between the taper part and the magnetic disk which is not easy to remove even by utilizing the contact stop and start method.

However, the following problems existed with the prior art cited above. Specifically, in the floating head slider of Japanese Unexamined Patent Publication (KOKAI) Nos. 61-170922 and 5-81810, it is possible to reduce the amount of dust that accumulates at the slider rail surface, and particularly at the slider rail outflow edge.

However, because the main accessing system used is a rotary system in which there is undulation about a prescribed rotational axis so as to achieve positioning at a prescribed radiation position, there is a finite angle (known as the yaw angle) that is formed between the longitudinal direction of the floating head slider and the tangential direction of the magnetic disk, the dust that is contained in the air which is taken in becoming affixed to and accumulating on side of the slider rail as well.

If this dust reaches the floating pressure generation surface of the slider rail, it causes an apparent increase in the surface area of the slider rail, so that the floating condition of the slider becomes unstable.

In the floating head slider of the Japanese Unexamined Patent Publication (KOKAI) No. 4-137286, consideration is given to dust being attached to the side of the slider.

However, with the exception of seek access, this configuration dictates that the air flow is divided into two or three parts within the slider rails, and in the case of a head slider that uses negative pressure, which will be described below, because dust becomes selectively attached to the negative pressure generation part even inside the slider, the suppression of dust by this method has no affect on the attachment of dust to the inside of the slider.

While a floating head slider known as a TPC (transverse pressure contour) slider has a level change portion, i.e., a step-like portion, with a depth of, for example, 0.5 to 1.5 $\mu$m from the floating pressure generation surface at both sides of the slider rail, with the floating head slider which is disclosed in the Japanese Unexamined Patent Publication (KOKAI) No. H4-137286, even on the outside surface of the slider, it is not possible to completely suppress attachment of dust to the above-described level change part.

In addition, in the case of a floating head slider which uses negative pressure, dust is pulled into a part at which the pressure at the slider rail side of the air outflow side is lower than the ambient air pressure, and in the case of the floating head slider that is disclosed in the Japanese Unexamined Patent Publication (KOKAI) No. 6-333354, the only effect achieved is a suppression of the attachment of dust at the air inflow side of the cross rail, this floating head slider not being capable of preventing instability of the floating condition caused by selective attachment of dust to the negative pressure generation part.

In view of the above-described drawbacks in the prior art, an object of the present invention is to provide a floating head slider in which stable floating and reading and writing of information is possible even if dust becomes attached to the slider rail side walls.

SUMMARY OF THE INVENTION

To achieve the above-noted object, a first aspect of the present invention is a floating head slider which has a slider element which in a case may be supports an electromagnetic conversion element that is disposed in opposition to a magnetic disk, and slider rails that are provided so as to protrude by a prescribed height at the surface of the magnetic disk side of the slider element and extend along the air flow, and that also function as an air bearing by virtue of the rotation of the magnetic disk.

The configuration is one in which the slider rails are formed by a floating pressure generation surface of a prescribed width and which is in opposition to the magnetic disk, and a side wall which extends from this floating pressure generation surface to a surface of the slider element, and in which the width formed between said both side walls at a part of said slider rail in the slider rail height direction, is smaller than the width of said floating pressure generation surface so as to form a depression on at least one of said side walls of said slider rail.

In another embodiment of this aspect of the present invention, the width of the center part in the slider rail height direction may be made smaller than the width of the floating pressure generation surface, a prescribed depression being formed in the side wall of the slider rails.

By adopting the above-noted configuration, the many particles of dust that float in the magnetic disk apparatus (not shown in the drawing) which houses a magnetic disk and a floating head slider accumulate on various parts of the floating head slider when the magnetic disk apparatus is used for a long period of time.

In particular, there is an accumulation of the above-noted air-born floating dust floating onto a side wall which is near the floating pressure generation surface of the slider rails.

However, a prescribed depression is formed in the side wall of the slider rails, this enabling the highly efficient capture of the dust, thereby suppressing its re-attachment to other parts.

In doing this, because of pressure of the floating pressure generation surface is higher than that in the area nearby this surface, it is easy for the dust to be guided into depressions in the slider rails, for example.

The accumulated dust does not flow out of to the floating pressure generation surface, so that there is no accumulation of dust in the area of the surface of the floating pressure generation surface and on a portion near this floating pressure generation surface.

For this reason, it is possible to maintain the initial floating condition, even if dust accumulates on the floating head slider, without having to change the shape or the surface area of the floating pressure generation surface.

In a second aspect of the present invention, the floating head slider has a slider element which, for example, may support an electromagnetic conversion element that is disposed in opposition to a magnetic disk, and a slider rail that is provided so as to protrude by a prescribed height at the surface of the magnetic disk side of the slider element and extend along the air flow, and that also functions as an air bearing by virtue of the rotation of the magnetic disk.

The configuration is one in which the slider rail is formed by a floating pressure generation surface of a prescribed width and which is in opposition to the magnetic disk, and a side wall which extends from this floating pressure generation surface to the side wall of the slider element, and in which the width at the slider element side is made narrower than the width at the floating pressure generation surface side, a prescribed depression being formed in the side wall of the slider rail.

By virtue of the above-noted configuration, the present invention as mentioned as the second aspect, has the same kind of operation as that explained in the first aspect of the present invention.

In addition, because the width of the slider rail is reduced simply, machining is simplified.

In a third aspect of the present invention, the configuration is such that a mutually linking surface is provided between floating pressure generation surface and the side wall, the linking surface thereof may be a smooth curved surface configuration or may be a flat surface and the angle of intersection between the floating pressure generation surface and the linking surface being an obtuse angle, and the angle of intersection between the linking surface and the side wall also being an obtuse angle.

The other configurations of this aspect are the same as the present inventions as explained above.

By adopting the above-noted configuration, the sharp part of the slider rail is eliminated, so that even if the floating head slider makes physical contact with the magnetic disk, there is no influence at all on the magnetic disk.

In a fourth aspect of the present invention, a negative pressure generation surface is provided adjacent to the slider rail and parallel to the floating pressure generation surface, this height of this negative pressure generation surface being established so as to be, for example, from 0.5 to 1.5 $\mu$m lower than the height of the slider rail, both a side wall between the floating pressure generation surface and the negative pressure generation surface and a side wall between the negative pressure generation surface and the slider element, or one of these side walls has a depression formed in it, the other constructions thereof being the same as the invention as explained above.

In the above-noted configuration, the surface area of the negative pressure generation surface is held constant so as to achieve a stable floating condition.

Additionally, the side wall of the slider element has the effect of properly suppressing a change in the floating condition of the floating head slider, because the weak negative pressure generation surface acts as a taper part, when in a region in which the yaw angle at the outer periphery is large.

In a fifth aspect of the present invention, two pairs of slider rails are provided, the air inflow part of thereof being linked by a cross rail, and of these the center parts of the slider rail side walls have a depression formed therein, other aspects of the configuration being the same as the inventions as mentioned above.

By adopting the above-noted configuration, it is possible to reliably capture dust, not only in the depression in the side walls of the slider rails, but also in the depression of the cross rail.

DESCRIPTION OF THE DRAWINGS

FIG. 1 is a drawing which shows the first embodiment of the present invention, FIG. 1(A) being a perspective view thereof, and FIG. 1(B) being a cross-sectional view along the line IB—IB which is shown in FIG. 1(A).

FIG. 4 is a drawing which shows the fourth embodiment of the present invention, FIG. 4(A) being a perspective view thereof, and FIG. 4(B) being a cross-sectional view along the line IVB—IVB which is shown in FIG. 4(A).

FIG. 6 is a drawing which shows the floating head slider disclosed in FIG. 5, FIG. 6(A) being a cross-sectional view along the line VIA—VIA which is shown in FIG. 5, and FIG. 6(B) being a cross-sectional view along the line VIB—VIB which is shown in FIG. 5.

FIG. 7 is a drawing which shows the sixth embodiment of the present invention, FIG. 7(A) being a perspective view thereof, and FIG. 7(B) being a cross-sectional view along the line VIIB—VIIB which is shown in FIG. 7(A).

FIG. 8 is a drawing which shows an example of a floating head slider in the prior art, FIG. 8(A) being a perspective view thereof, and FIG. 8(B) being a cross-sectional view along the line VIIIB—VIIIB which is shown in FIG. 8(A).

DETAILED DESCRIPTION OF THE PREFERRED EMBODIMENTS

Embodiments of present invention are described below, with reference being made to the relevant accompanying drawings.

Figure 1A:
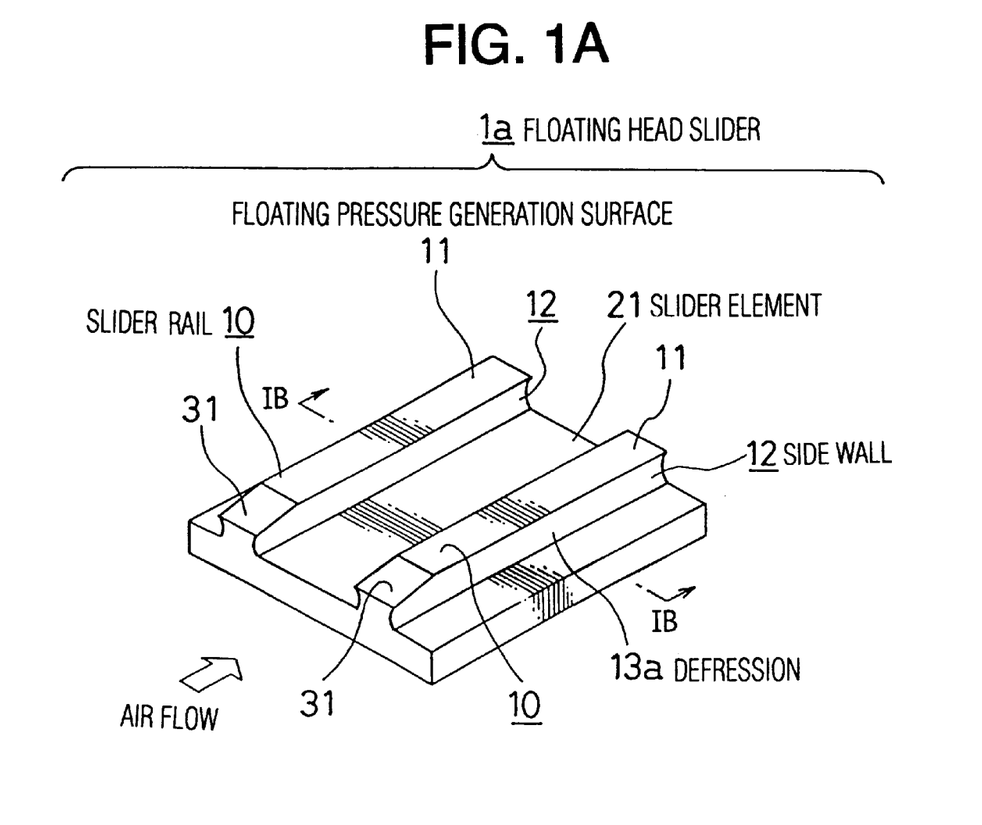

First, FIG. 1(A) is perspective view which shows the first embodiment of the present invention, and more specifically the part of the floating head slider that opposes the magnetic disk.

This floating head slider 1a has a slider element 21 which, in the case may be, supports an electromagnetic conversion element (not shown in the drawing) which is disposed in opposition to a magnetic disk (not shown in the drawing), and slider rails 10 that are provided so as to protrude by a prescribed height at the surface of the magnetic disk side of the slider element and extend along the air flow, and that also function as an air bearing by virtue of the rotation of the magnetic disk.

The slider rails 10 are formed by a floating pressure generation surface 11 of a prescribed width and which is in opposition to the magnetic disk, and side walls 12 which extends from this floating pressure generation surface 11 to a surface of the slider element 21, and in which, of the width of the slider rails 10, the width of the center part in the slider rail 10 in height direction thereof is made smaller than the floating pressure generation surface 11, a prescribed depression 13a being formed in the side wall 12 of the slider rails.

More specifically, the slider element 21 has a flat rectangular shape, and in this embodiment is long in the direction of air flow. The thickness of the slider element 21 is established as a prescribed thickness, an electromagnetic conversion element (not shown in the drawing) being, for example, provided at the air outflow end of this slider element 21.

One side of the slider element 21, and more specifically the surface on the side of the slider element 21 which opposes the surface of the magnetic disk, is provided with prescribed slider rails 10 that protrude to a prescribed height.

Two of these slider rails 10 are provided, one on each side of the air flow direction of the slider element 21. The length of the slider rails 10 is approximately the same as the length of the slider element 21.

The slider rails 10 have a floating pressure generation surface 11 that is in greatest proximity to the magnetic disk, and a slider rail side wall. On the air inflow end of the air flow of each slider rail 10, there is prescribed inclined part or tapered portion 31, this establishing a proper flow of air between the magnetic disk and the slider rail 10.

Next, the configuration of the side wall 12 of the slider rail 10 will be described in further detail.

Figure 1B:
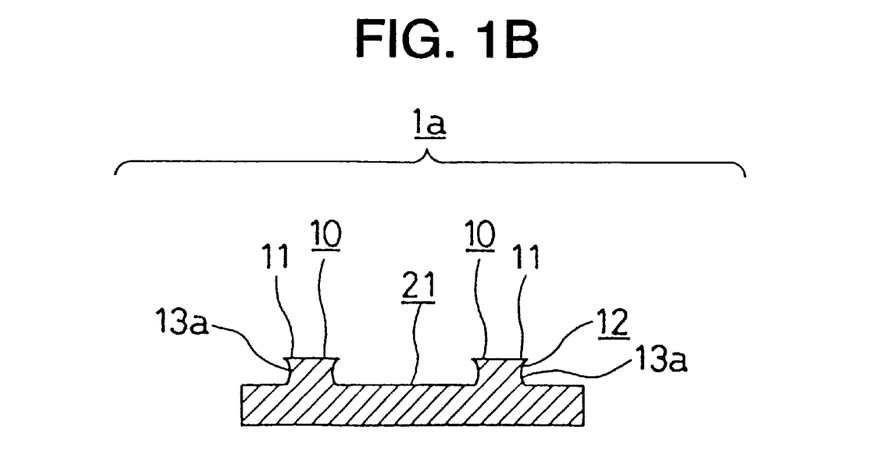

As shown in FIG. 1(B), in contrast to the side wall of a conventional slider rail, the side wall 12 has formed in it a prescribed depression 13a.

This depression 13a is formed so that the width of the slider rail 10 gradually decreases from the floating pressure generation surface 11 of the slider rail 10 towards the center part of the side wall in the height direction, after which it gradually increases again as it approaches the slider element 21. This side wall 12 and the slider element 21 are linked together.

While the cross-section of the depression 13a is shown as an arc in FIG. 1(B), the present invention does not present any restriction in this regard, it being possible to use a shape whereby the width of the slider rail 10 is reduced linearly from the floating pressure generation surface 11 toward the center part in the height direction, after which this width again increases linearly as it approaches the slider element 21.

That is, a feature of the present invention that the side wall 12 of the slider rail 10 is slightly inclined inwardly at both edges of the floating pressure generation surface 11, and various shapes that satisfy this condition can be envisioned.

As explained above, in the present invention, the basic technical conception is that a depression 13 is formed on the side wall 12 of the slider rail 10 and the position on which the depression 13 is formed on the side wall 12 is not restricted but it can be formed any portion of the side wall 12.

And also the size and the shape of the depression 13 are not restricted and any size including a depth of the depression and shape can be used as long as the depression 13 has a function in that a negative pressure can be created therein and the dust can be effectively trapped therein and kept for a long time so as not to easily detached therefrom causing a separate problem under which the detached dust being reaccumlated other important port of the slider without changing a predeterminedly set an area of the floating pressure generation surface 11 so as to keep the floating force of the slider at a constant level.

Accordingly, in the present invention, the depression 13 can be formed not only at a center portion of the side wall 12 of the slider rail 10 with respect to height direction but also be formed on a portion of the side wall 12 being in the vicinity of the floating pressure generation surface 11 or near the root portion of the slider rail 10.

Note that the shape of the depression 13 can be configured with linear line, i.e., a flat surface, including an inclined flat surface and a vertical flat surface or any kinds of curved lines, i.e., curved surfaces as well as the combination thereof.

Further, although, in the above-mentioned embodiment of the present invention, the depressions 13 are formed on the both side walls of the slider rail 10, it can formed only one side of the side wall of the slider rail 10.

In a case when the depression 13 is formed only one of the side walls of the slider rail 10, it is preferably formed on a side wall thereof which opposing to a center portion of a disk.

Turning now to a description of the action and functioning of a floating head slider 1a configured as described above, before the magnetic disk (not shown in the drawing) starts to rotate, the floating head slider 1a is in contact with the surface of the magnetic disk.

Then, when the magnetic disk starts to rotate, accompanying this rotation an air flow is generated at the surface of the magnetic disk. When this occurs, because the floating head slider la is supported by a prescribed arm element or supporting element (not shown in the drawing), it is maintained in a prescribed position even if the magnetic disk starts rotating.

Because the air flow that is generated at the magnetic disk surface has a relative velocity with respect to the floating head slider 1a, which is fixed, the a flow of air is guided between it and the floating pressure generation surface 11 of the slider rail 10. Between it and the magnetic disk, an electromagnetic conversion element which is provided on the floating head slider 1a performs reading and writing of data.

In doing this, the floating head slider 1a floats by means of the air flow that is generated because of the rotation of the magnetic disk, and because it is supported via an arm element or supporting element pivoting at a center of rotation, which is offset by a prescribed distance from the center of the magnetic disk, there is not necessarily a coincidence between the linearly configured slider rail 10 and the air flow direction at the surface of the magnetic disk. Therefore, an air flow that makes a prescribed angle with respect to the longitudinal direction of the slider rail 10 strikes the slider rail 10.

Inside of a magnetic disk apparatus (not shown in the drawing) that houses such elements as a magnetic disk and the floating head slider 1a, a large amount of dust is generated by various causes.

For this reason, use for a long period of time results in accumulation of dust on the various parts of the floating head slider 1a. The dust in the air flow accumulates particularly on the side wall 12 in proximity to the floating pressure generation surfaces 11 of the slider rails 10.

However, a prescribed depression 13a is formed in the side walls 12 of the slider rails 10, this enabling the highly efficient capture of this dust, thereby suppressing its re-attachment to other parts.

In doing this, because the pressure of the floating pressure generation surface 11 is higher than the pressure in the area nearby this surface, it is easy for the dust to be guided into the depressions 13a in the slider rails 10, for example.

The accumulated dust does not flow out of to the floating pressure generation surfaces 11, so that there is no accumulation of dust in the floating pressure generation surfaces 11 and the area near these floating pressure generation surfaces 11.

For this reason, it is possible to maintain the initial floating condition, even if dust accumulates on the floating head slider 1a, without having to change the shape or the surface area of the floating pressure generation surfaces 11.

Note that, in the present invention, even though the dust are accumulated in the depression 13, if a part of the accumulated dust would not be protruded beyond a virtual surface of the side wall 12 of the slider rail 10, the slider floating force generated by the floating pressure generation surface 11 is not substantially changed and kept at a constant level.

Figure 2:
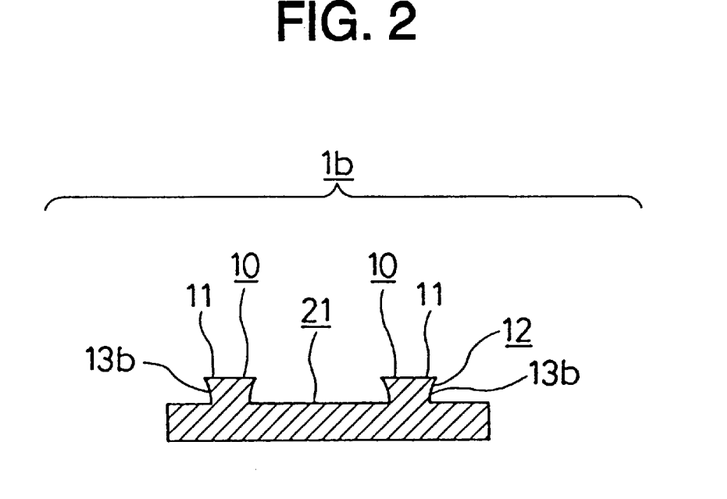
FIG. 2 is a cross-sectional view of the second embodiment of the present invention.

FIG. 2 is a drawing which shows the second embodiment of the present invention.

In this embodiment, the floating head slider 1b is basically configured in the same way as the first embodiment, with the exception that, of the slider rail 10 widths, the width at the slider element side is made narrower than the width at the floating pressure generation surface 11 side.

More specifically, the depression 13b of the side walls 12 has an inclination that reduces the width of the surface of the floating head slider from the floating pressure generation surface 11 toward the slider element, this depression 13b joining with slider element 21.

To establish a sufficient width of the slider rail 10 at the slider element 21, the depression 13b, compared to the case of the depression 13a of the first embodiment, has an smaller angle of inclination.

For this reason, the amount of depression in the area of the floating pressure generation surface 11 of the slider rail 10 is made small, the capacity for accumulated dust being reduced, as is the amount of time for maintaining the initial floating condition.

However, in the case of forming the slider rails 10 of this embodiment by means of etching or the like, adjustment of the incident angle using milling or the over-etching effect, it is significantly easier than in the case of the depression 13a of the first embodiment.

Figure 3:
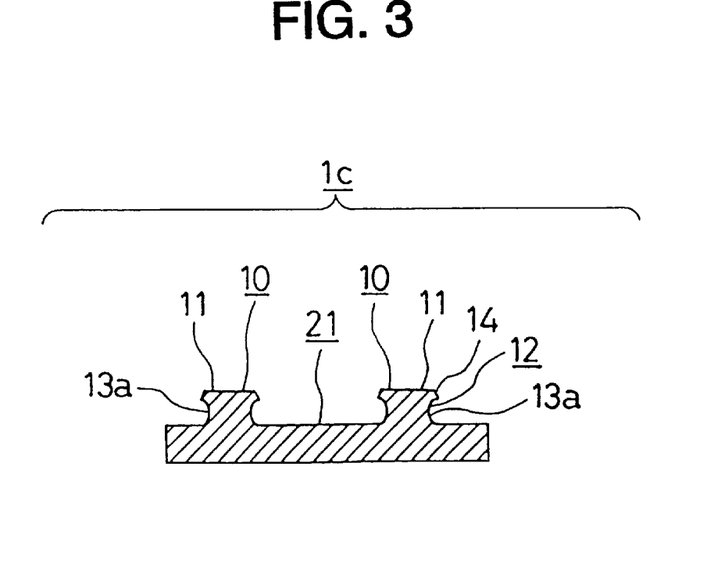
FIG. 3 is a cross-sectional view of the third embodiment of the present invention.

FIG. 3 shows the third embodiment of the present invention. In this embodiment, in addition to the configuration of the first and second embodiments, a prescribed linking surface 14 is provided between the floating pressure generation surface 11 of the slider rail 10 and the side wall 12 thereof, the angle of intersection between the floating pressure generation surface 11 and the linking surface 14 being made an obtuse angle.

Further in this embodiment, the angle formed between the linking surface 14 and the side wall may also be obtuse, if necessary.

While, this linking surface 14 may be configured in curved smooth surface, if necessary.

More specifically, as shown in FIG. 3, the floating pressure generation surface 11 is approximately horizontal, and there are linking surfaces 14 formed at either side thereof at a prescribed angle of intersection therewith. The angle of intersection between this linking surface 14 and the floating pressure generation surface 11 is obtuse (greater than 90 degrees).

In this embodiment, because the angle is made just slightly greater than 90 degrees, the linking surface is approximately vertical. The angle of intersection between the linking surface 14 and the side wall 12 is not restricted to a specific angle but it may is also obtuse, if necessary.

Specifically, there is a depression 13a formed in the side wall 12 similar to that described above, the angle of intersection between the location at which the depression 13a begins and the linking surface 14 being preferably an obtuse angle.

By adopting a configuration as described above, during contact start/stop and seeking operations, even if the floating pressure generation surface 11 is in contact with the surface of the magnetic disk, it is not easy to impart damage to the magnetic disk, thereby providing a reduction in damage to the magnetic disk.

In the present invention, the linking surface 14 may be formed with a curved and smooth surface so as to effect the same advantage as mentioned above.

Figure 4A:
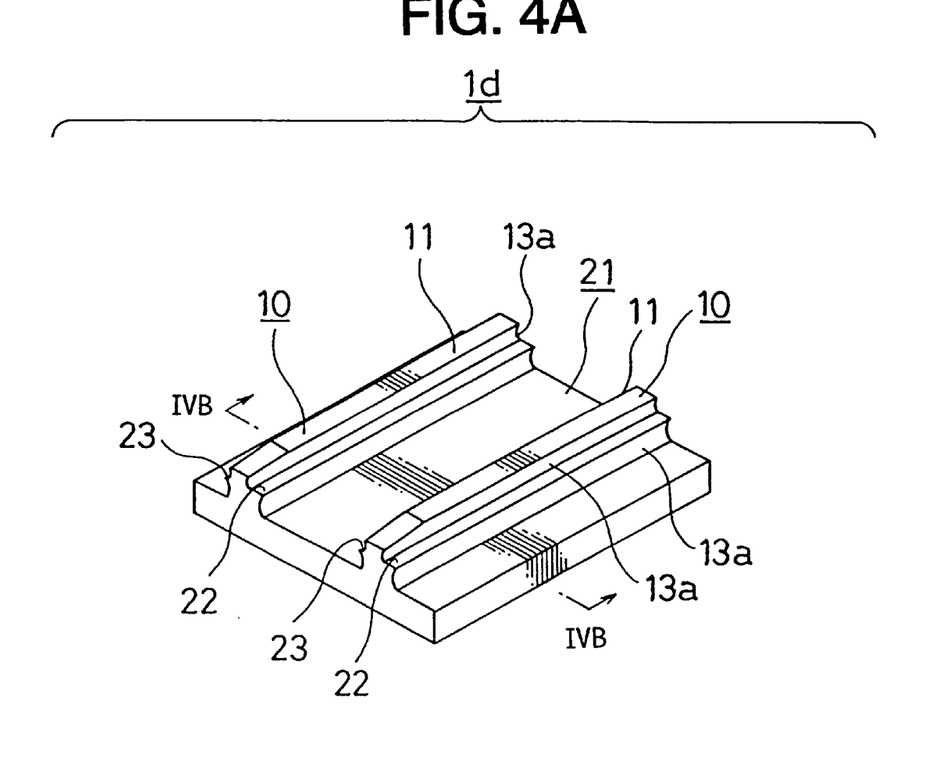
Figure 4B:
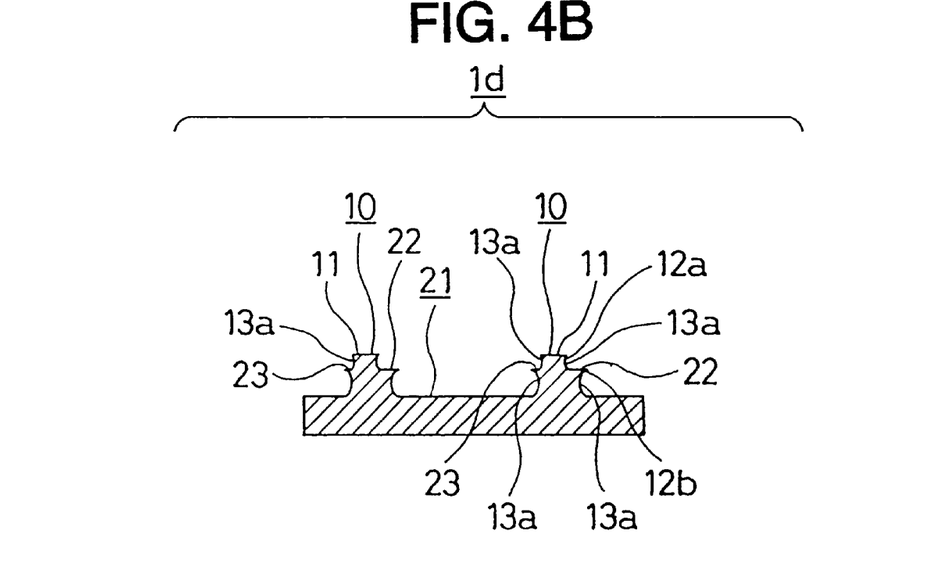

FIG. 4(A) and FIG. 4(B) show the fourth embodiment of the present invention. FIG. 4(A) is a perspective view of a floating head slider 1d, which is known as a TPC slider.

A floating head slider of this type has not only slider rails 10, but also prescribed negative pressure generation surfaces 22 and 23 of the slider rail 10. The height of these negative pressure generation surfaces 22 and 23 is established, for example, at 0.5 to 1.5 μm lower than the height of the slider rails 10.

There is also a weak negative pressure generation surface 23 on the outer periphery side of the floating pressure generation surfaces 11, and a strong negative pressure generation surface 22 on the inner periphery side of the floating pressure generation surfaces 11.

The above-noted outer and inner periphery refer to the magnetic disk (not shown in the drawing), the left side in FIG. 4(B) being the outer periphery radial direction of the magnetic disk, the right side being the side facing the center of the magnetic disk.

More specifically with regard to the side wall 12 in this case, FIG. 4(B) shows the cross-sectional view of the floating head slider 1b as seen along the line B—B which is shown in FIG. 4(A). As shown in FIG. 4(B), the side wall 12 of the slider rail 10 is formed by a side wall 12a, which joins the floating pressure generation surface 11 and the negative pressure generation surfaces 22 and 23, and the side walls 12b, which joins the negative pressure generation surfaces 22 and 23 with the slider element 21.

Of these, in addition to the floating pressure generation surface 11 having the effect which was indicated with respect to the first embodiment serving to stable the floating condition of the slider in cooperation with the surface areas of the negative pressure generation surfaces 22 and 23.

In addition, the side wall 12b at the slider element 21 side has the effect of properly suppressing a change in the floating condition of the floating head slider 1d, because the weak negative pressure generation surface 23 acts as a taper part, in a region in which the yaw angle at the outer periphery of the magnetic disk is large.

The depressions 13a and 13b that are formed in the side walls 12a and 12b of the slider element 21, are not limited to formation at both the floating pressure generation surface 11 side and the slider element 21 side, as shown in FIG. 4(B), but rather can be formed either at only the floating pressure generation surface 11 side or at only the slider element 21 side.

Figure 9:
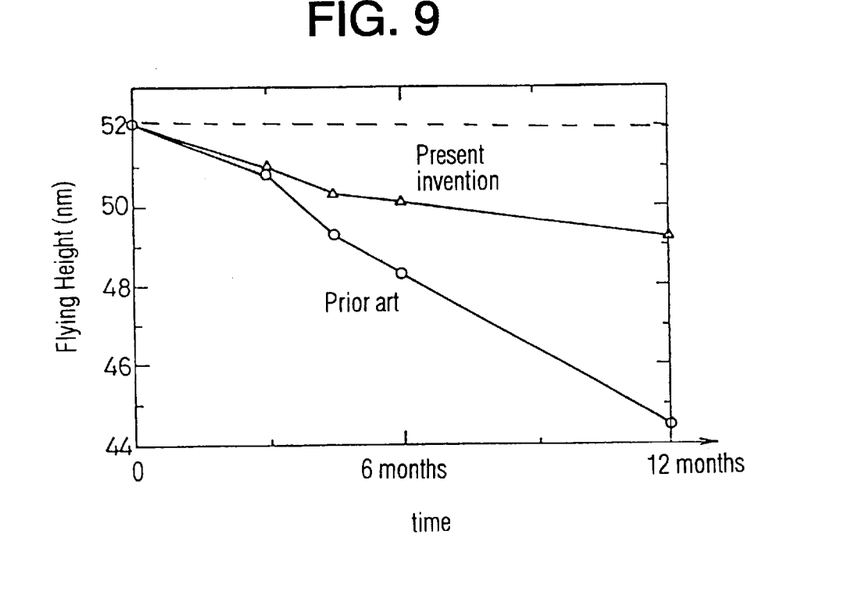
FIG. 9 shows a comparison data between the present invention and a conventional method.

FIG. 9 shows a comparative experimental data between a TPC type slider of the present invention and the conventional type TPC slider.

The configuration of both TPC slider is same to each other but the only a different point existing therebetween is that the TPC type slider of the present invention has the depression 13 on the side wall 12 of slider rail 10.

This comparative data shows a result of an estimation data obtained from an accelerated test applied thereto and this test data representing a relationship between an elapsed time and a flying height.

Note that in FIG. 9, the vertical axis represents a flying height of the slider from a surface of a medium while the abscissa represents an elapsed time the unit thereof being a month.

In FIG. 9, a dotted line denotes an ideal line in which no dust is accumulated accumulated on a surface of the floating pressure generation surface 11, while in the present invention, as shown by the line indicated as the present invention, the dust had accumulated only on a surface of the floating pressure generation surface 11 but the total amount of the dust accumulated thereon had been reduced.

On the contrary to this, in the prior art, as shown in the line indicated as the prior art, the dust had accumulated both on the side wall of the rail and on a surface of the floating pressure generation surface 11.

As apparent from this result, the flying height of the conventional TPC type slider had linearly reduced remarkably, while in the present invention, the flying height had not so remarkably reduced.

Therefore, it is clear that the slider of the present invention can effectively trap the dust and the life time thereof can be extended.

Figure 5:
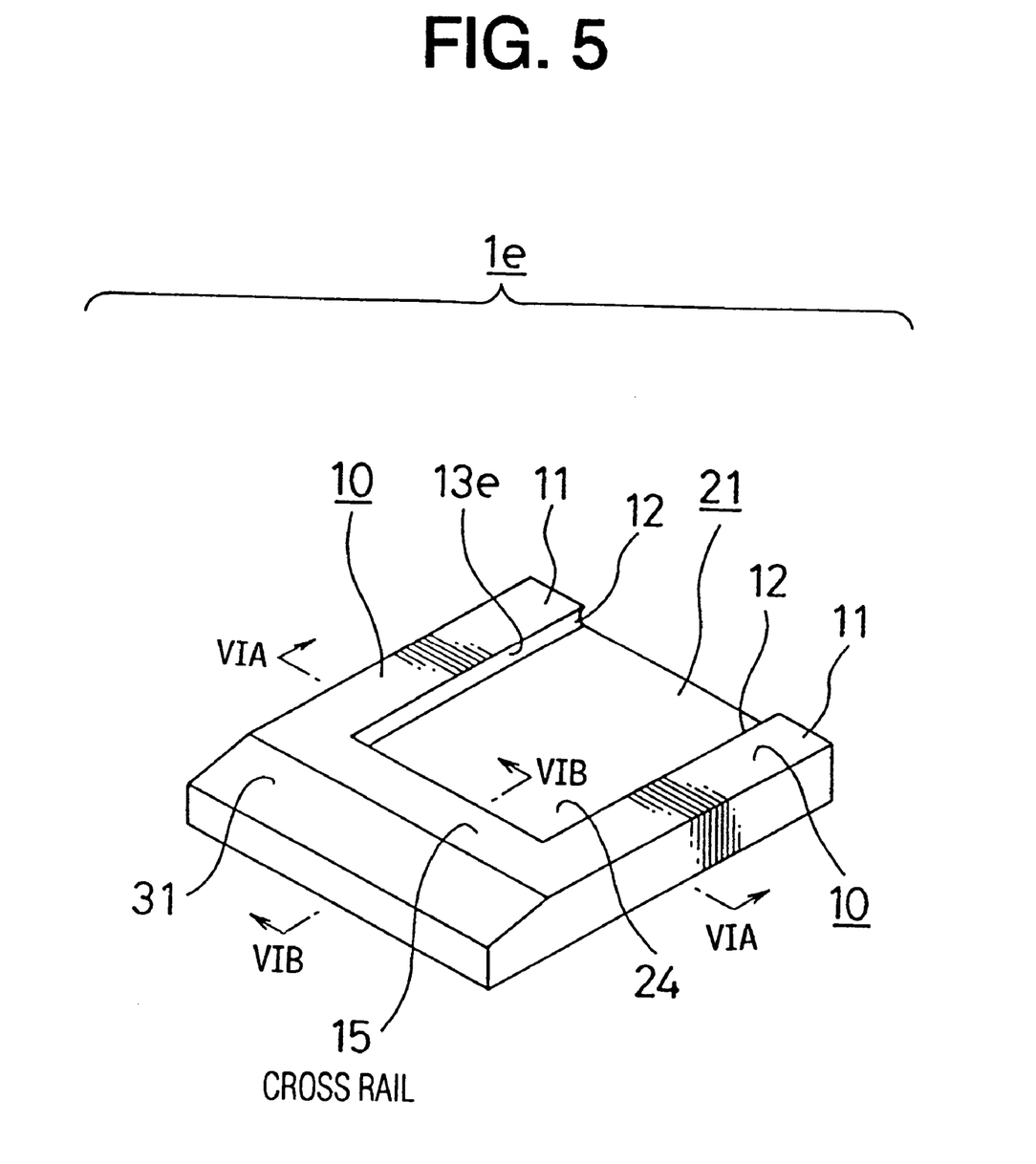
FIG. 5 is a perspective view of the fifth embodiment of the present invention.
Figure 6A:
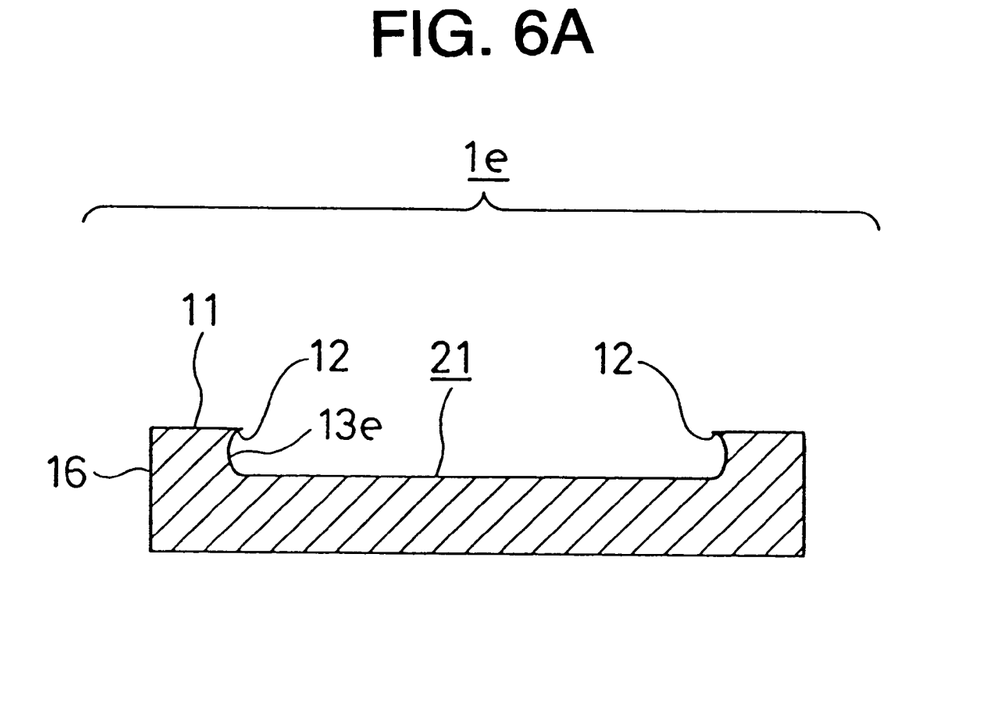
Figure 6B:
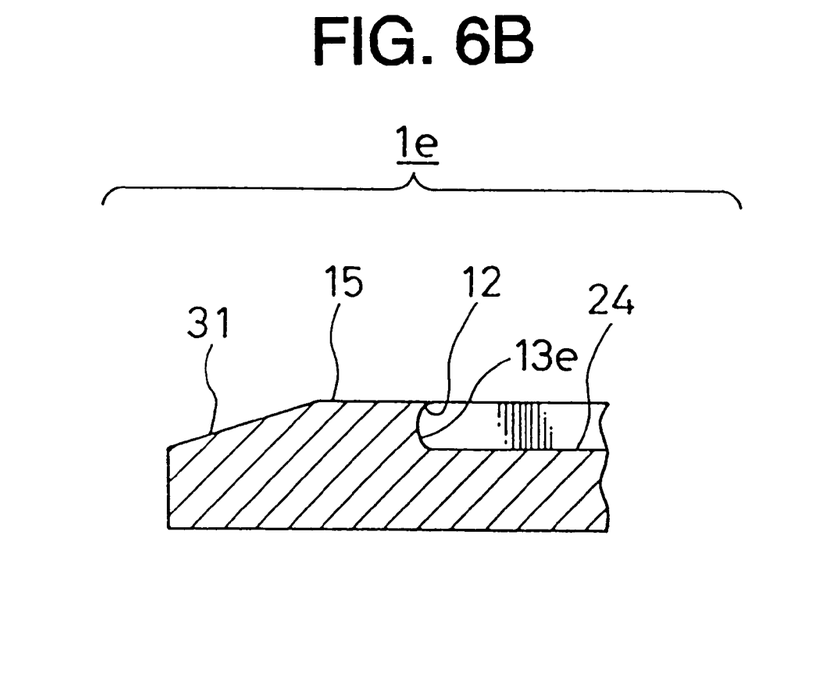

FIG. 5 and FIG. 6 will be used to describe the fifth embodiment of the present invention. In this embodiment, as shown in FIG. 5, two slider rails 10 are provided, a cross rail 15 being provided at the air inflow side of the slider rails 10. A depression 13e is formed on the inside of the side walls 12 of the slider rails 10 and the cross rail 15.

A prescribed inclination 31 is formed on the air inflow edge of the cross rail 15, so that the flow of air is properly guided between the magnetic disk and the slider rails 10.

The area in the above-noted floating head slider 1e which is surrounded by the slider rails 10 and the cross rail 15 forms a negative pressure pocket 24, so called a cavity.

As shown in the above-noted drawings, the side walls 12 on the negative pressure pocket side of the slider rails 10 and the cross rail 15 each have formed on them the depression 13e.

By providing such a depression 13e, it is possible to reliably capture dust, and to suppress the air flow thereof toward the floating pressure generation surfaces 11.

Additionally, on the side walls of the slider rails 10 that does not face to the negative pressure pocket 24, there is no need for complex machining.

Figure 7A:
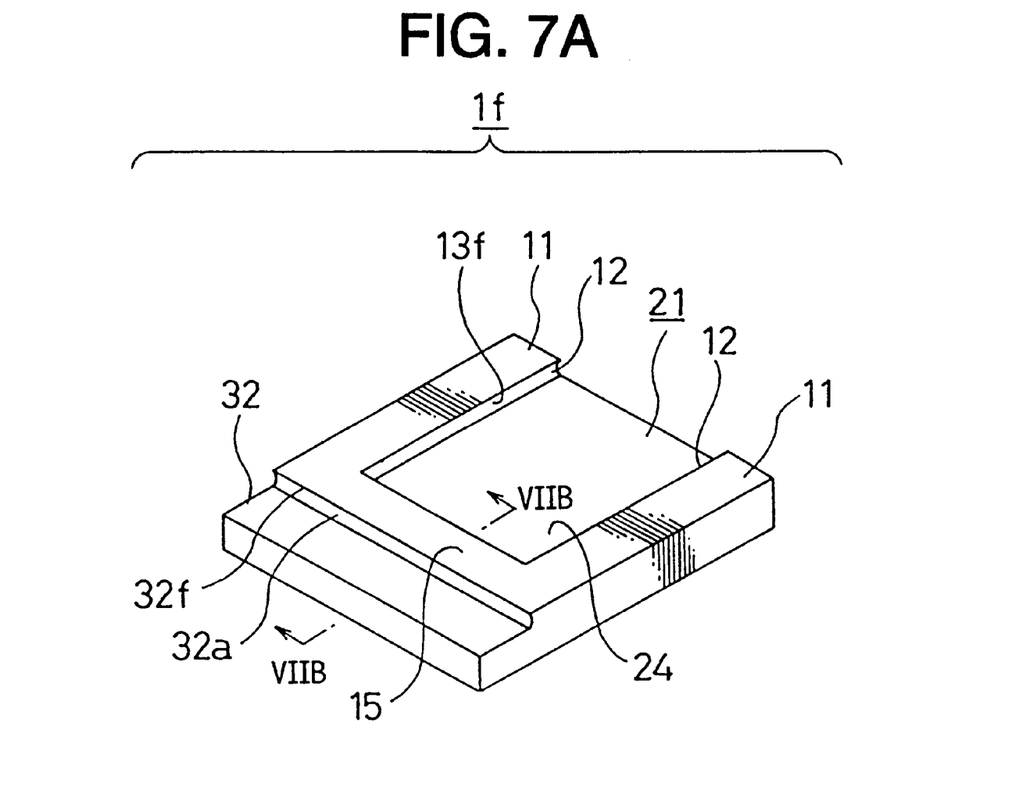
Figure 7B:
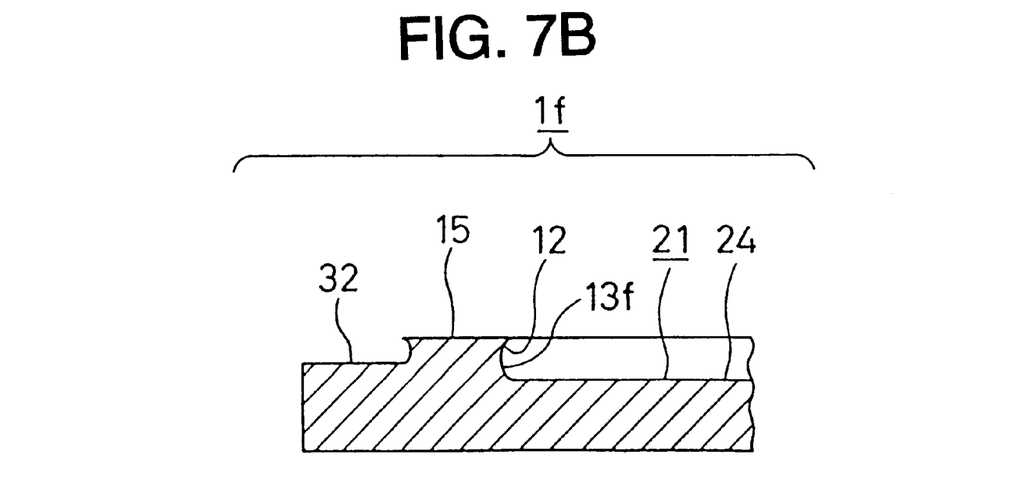

The sixth embodiment of the present invention is shown in FIG. 7(A) and FIG. 7(B).

In this embodiment, in addition to the provision of two slider rails 10 as is the case in the fifth embodiment shown in FIG. 5 and FIG. 6, the air inflow edges of each of the slider rails 10 are joined by a cross rail 15, a depression 13f being formed on the inside side walls 12 of the slider rails 10 and cross rail 15.

At the air inflow part of the cross rail 15, in place of the prescribed inclination that is shown in FIG. 5, there is a shallow recess 32.

The shallow recess 32 may have a depth being smaller than that of the the cavity 24, i.e., the negative pressure pocket 24 but it may have the same depth as that of the cavity 24, in the case may be.

The side walls 12 on the negative pressure pocket side of the slider rails 10 and cross rail 15 a prescribed depression 13f is formed as described in the foregoing embodiments. In addition, a depression 32f is formed in the side wall 32a of the shallow recess 32.

Figure 10:
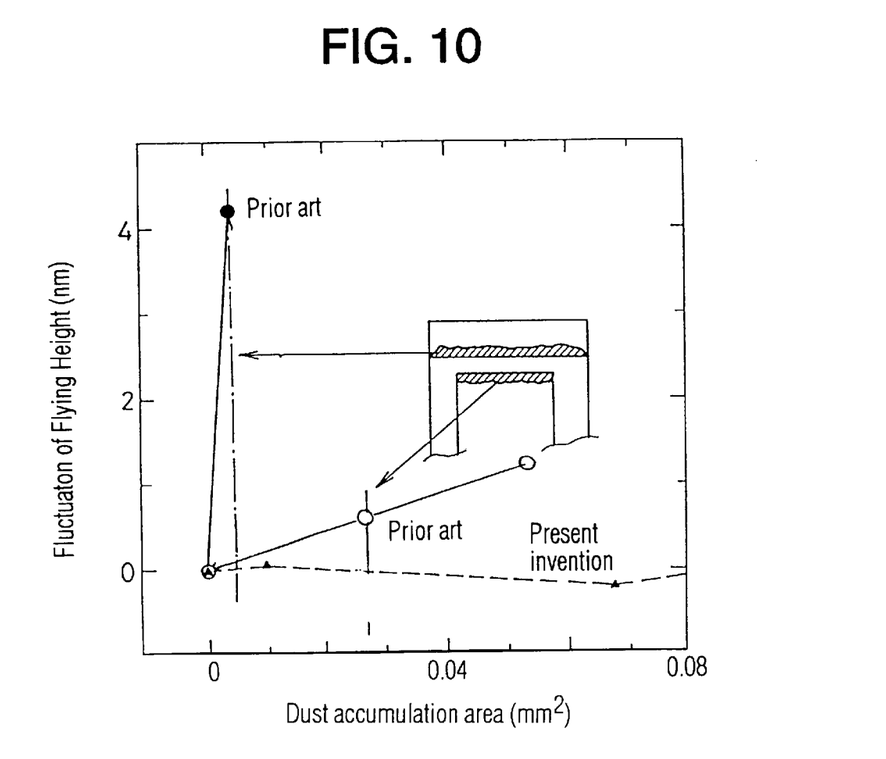
FIG. 10 shows an another comparison data between the present invention and a conventional method.

FIG. 10 shows a comparative experimental data between a slider of the present invention as shown in FIG. 7 with a depression 13 as defined above and a conventional slider without having such depression, but both having the same configuration as each other except for the depression and obtained by a simulation test applied thereto.

This comparative data shows a relationship between an area($mm^2$) formed by the accumulation of the dust on the specific portion of the slider and a variation in the flying height (nm).

It is apparent from this test result, that in a conventional slider, when even a small amount of dust had accumulated on the step-like portion of the slider which is provided a front end thereof, the fluctuation in the flying height (nm) is greatly increased and then when the amount of the accumulation of the dust on the step-like portion of the slider is further increased the the variation in the flying height (nm) is greatly reduced.

That means the control of the accumulation of the dust on the step-like portion of the slider would be very important factor.

On the other hand, regarding the dust accumulation of an inside side wall of the slider facing to the negative pressure pocket 24, the fluctuation in the flying height (nm) is slightly increased.

However, in the present invention, as shown in FIG. 10, the variation in the flying height (nm) is kept in small and typically at zero, regardless the amount of dust accumulation either on the step-like portion or the inside side wall of the slider facing to the negative pressure pocket 24.

Therefore, the effect of the depression 13 formed on the side wall of the slider on the present invention is apparently confirmed.

The above has been a detailed description of various embodiments of the present invention. Of these, in the floating head slider described with regard to the fourth to sixth embodiments, the shape of the depression formed in the side wall can be such that the width is gradually reduced in the direction approaching the slider element, as is shown in the second embodiment, and can also have a linking surface as shown in the third embodiment.

Although the various embodiments of the present invention were described for the case of a floating head slider with two slider rails, the present invention imposes no such limitation in this regard, it being possible to apply the present invention to the case of a separate rail or prescribed pad in between the slider rails.

In addition, it is possible to provided the depression, which is provided on both sides of the slider rail in the descriptions of the above-noted embodiments, on just one side thereof (either the side toward the inside periphery or the outside periphery of the magnetic disk), and also possible to provide this depression on only a part of a plurality of slider rails, in which case it is desirable that it be provided on a slider rail having a low amount of float.

By providing a slider rail and forming a prescribed depression in a side wall thereof, the present invention allows dust to be accumulated on the surface of the depression but prevents so much dust from accumulating in the region of the floating pressure generation surface, by having the dust become attached to the above-noted depression, even in the case in which dust becomes attached to the side wall of a slider rail.

As a result, it is possible to reliably suppress a change in the floating condition of the floating head slider, even during long periods of use, without having a change in the surface area of the floating pressure generation surface.

Another positive effect of the present invention is that the depression in the side wall captures the dust in the air flow, enabling a lowering of the amount of dust that becomes attached to the floating pressure generation surface of the floating head slider.

The cross-sectional shape of the slider rail is such that the width is reduced when moving from the floating pressure generation surface toward the slider element. This shape can be easily fabricated by etching, with adjustment of the incident angle by milling or the use of the over-etching effect, thereby enabling a reduction in the cost of manufacture.

Another effect of the present invention is achieved by making the angle of intersection between the floating pressure generation surface and the linking surface of the slider rail an obtuse angle, the result of this being that, in a floating head slider of the contact start/stop type, even if the slider rail of the floating head slider makes contact with the magnetic disk, there is no adverse effect on the magnetic disk.

Because negative pressure generation surfaces are provided on both sides of the slider rail, with depressions formed in each of the side walls thereof, not only is it possible to reliably capture dust, but it is also possible to stabilize the floating condition of the floating head slider.

An addition feature of the present invention is that, by joining two slider rails at the air inflow end using a cross rail and forming a depression in the side walls of these slider rails and the cross rail, it is possible to reliably capture dust which flows into the negative pressure pocket surrounded by these rails.

What is claimed is:

1. A floating head slider comprising:

a slider element; and at least one slider rail which protrudes by a prescribed height at a surface of said slider element, opposite to a magnetic disk, which extends along an air flow, and which functions as an air bearing by virtue of rotation of a magnetic disk, said slider rail comprising a floating pressure generation surface which has a prescribed width and which is disposed in opposition to a magnetic disk, and side walls which connect both side ends of said floating pressure generation surface and a surface of said slider element, the width between said both side walls at a part of said slider rail in the slider rail height direction, is smaller than the width of said floating pressure generation surface so as to form a depression in at least one of said side walls of said slider rail.

2. A floating head slider according to claim 1, wherein said depression is in both side walls of said slider rail.

3. A floating head slider according to claim 1, wherein said depression is in a center part of at least one of said side walls of said slider rail in the slider rail height direction.

4. A floating head slider according to claim 1, wherein said depression is one of a curved surface, a flat surface, and combination of a curved surface and a flat surface.

5. A floating head slider according to claim 1, wherein said slider element supports an electromagnetic conversion element that is disposed in opposition to a magnetic disk.

6. A floating head slider according to claim 1, wherein said slider further comprises a prescribed linking surface, which is between said floating pressure generation surface and said side wall, said surface being a curved smooth surface.

7. A floating head slider according to claim 1, wherein said slider further comprises a prescribed linking surface, which is between said floating pressure generation surface and said side wall, at least the angle of intersection between said floating pressure generation surface and said linking surface being an obtuse angle.

8. A magnetic disk device comprising a magnetic disk driving means, a head holder, a head holder driving means, and a floating head slider supported by said head holder, said floating head slider being defined by afore-mentioned claim 1.

9. A floating head slider comprising:

a slider element; and at least one slider rail which protrudes by a prescribed height at a surface of said slider element, opposite to a magnetic disk, which extends along an air flow, and which functions as an air bearing by virtue of rotation of a magnetic disk, said slider rail comprising a floating pressure generation surface which has a prescribed width and which is disposed in opposition to a magnetic disk, and side walls which connect both side ends of said floating pressure generation surface and a surface of said slider element, said slider rail further comprising a negative pressure generation surface which is parallel to said floating pressure generation surface, the height of said negative pressure generation surface being lower than the height of said slider rail, and wherein a depression is formed in at least one of a side wall between said floating pressure generation surface and said negative pressure generation surface and a side wall between said negative pressure generation surface and said slider element.

10. A floating head slider according to claim 9, wherein said depression is in both side walls between said floating pressure generation surface and said negative pressure generation surface and between said negative pressure generation surface and said slider element and in at least one side of said slider rail.

11. A magnetic disk device comprising a magnetic disk driving means, a head holder, a head holder driving means, and a floating head slider supported by said head holder, said floating head slider being defined by afore-mentioned claim 9.

12. A floating head slider comprising:

a slider element;

two slider rails which protrude by a prescribed height at a surface of said slider element, opposite to a magnetic disk, which extend along an air flow, and which function as air bearings by virtue of rotation of a magnetic disk, said slider rails each comprising a floating pressure generation surface which has a prescribed width and which is disposed in opposition to a magnetic disk, and side walls which connect both side ends of said floating pressure generation surface and a surface of said slider element; and a cross rail which joins said two slider rails at the air inflow ends thereof, said slider further comprising depressions in at least one of said side walls of each of said slider rails and opposite to a center portion of said slider element and on a side wall of said cross rail opposite to a center portion of said slider element.

13. A floating head slider according to claim 12, wherein a step-like portion is provided perpendicularly with respect to the air flow and along the air inflow edge of said cross rail, said depression being provided on a side wall of said step-like portion.

14. A floating head slider according to claim 12, wherein said depression is in both side walls of said slider rail.

15. A floating head slider according to claim 12, wherein said depression is in a center part of at least one of said side walls of said slider rail in the slider rail height direction and on a center part of said side walls of said step-like portion in its height direction.

16. A floating head slider according to claim 12, wherein said depression is one of a curved surface, a flat surface, and a combination of a curved surface and a flat surface.

17. A floating head slider according to claim 12, wherein said slider element supporting an electromagnetic conversion element that is disposed in opposition to a magnetic disk.

18. A floating head slider according to claim 12, wherein said slider further comprises a prescribed linking surface, which is between said floating pressure generation surface and said side wall, said surface being a curved smooth surface.

19. A floating head slider according to claim 12, wherein said slider further comprises a prescribed linking surface, which is between said floating pressure generation surface and said side wall, the angle of intersection between said floating pressure generation surface and said linking surface being an obtuse angle, and the angle of intersection between said linking surface and said side wall being an obtuse angle.

20. A magnetic disk device comprising a magnetic disk driving means, a head holder, a head holder driving means, and a floating head slider supported by said head holder, said floating head slider being defined by afore-mentioned claim 12.

21. A method for controlling air flow in a magnetic disk device, the magnetic disk device having a slider element and at least one slider rail which protrudes by a prescribed height at a surface of the slider element, opposite to a magnetic disk, which extends along an air flow, and which functions as an air bearing by virtue of rotation of a magnetic disk, the slider rail having a floating pressure generation surface which has a prescribed width and which is disposed in opposition to a magnetic disk, and side walls which connect both side ends of the floating pressure generation surface and a surface of the slider element, said method comprising the step of forming a depression on at a part of the side wall of the slider rail so as to create a relatively negative pressure in the depression to thereby trap dust inside the depression and to hold same therein.

* * * * *